United States Patent [19]

Le Naour-Sene

[11] 4,257,692
[45] Mar. 24, 1981

[54] METHOD OF MARKING OPHTHALMIC LENSES OF ORGANIC MATERIAL AND LENSES SO MARKED

[75] Inventor: Lyliane Le Naour-Sene, Vincennes, France

[73] Assignee: Essilor International "Cie Generale d'Optique, Creteil, France

[21] Appl. No.: 951,264

[22] Filed: Oct. 13, 1978

[30] Foreign Application Priority Data

Oct. 14, 1977 [FR] France ................................. 77 30928

[51] Int. Cl.³ .......................... D06P 3/00; G02C 7/02
[52] U.S. Cl. ....................................... 351/159; 8/471; 8/506; 8/509; 8/515; 8/648
[58] Field of Search ...................... 351/159, 162, 163; 8/2.5 A, 470, 471, 507

[56] References Cited

U.S. PATENT DOCUMENTS

| 2,929,931 | 3/1960 | Richter et al. .................... 351/162 X |
| 3,872,042 | 3/1975 | Bond ................................ 351/159 X |
| 4,059,471 | 11/1977 | Haigh ............................... 8/2.5 A X |
| 4,137,042 | 1/1979 | De'fago et al. ........................ 8/470 |

FOREIGN PATENT DOCUMENTS

1400566  4/1965  France ....................................... 351/161

*Primary Examiner*—John K. Corbin
*Assistant Examiner*—Scott J. Sugarman
*Attorney, Agent, or Firm*—Charles E. Brown

[57] ABSTRACT

A method of marking an ophthalmic lens of organic material and the lens so marked. A marking substance containing an optical brightener which is a derivative of benzoxazolyls stilbenes, or benzotriazoles is mixed with a suitable binder and solvent and applied to a surface of the lens to be marked by thermal transfer from a transfer support. The marking substance is shaped to the desired configuration either when applied to the transfer support or by a mask defining the mark or indicia to be applied. Heat is applied to the marking substance and the lens which sublimes the optical brightener which then penetrates into the organic material of the lens to be anchored therein. The resultant indicia or mark provides a permanent marking of the lens and is only visible in ultra-violet light.

11 Claims, 5 Drawing Figures

METHOD OF MARKING OPHTHALMIC LENSES OF ORGANIC MATERIAL AND LENSES SO MARKED

BACKGROUND OF THE INVENTION

The present invention relates generally to the marking of ophthalmic lenses of organic material.

It is customary to apply after manufacture one or more marks or indicia on such ophthalmic lenses, such as, cross hairs or X's indicating the optical center, particularly when the optical center does not coincide with the geometric center, and/or an indication of corrective power of the lens.

Such marks are intended to facilitate the practitioner's job of mounting the lens in eyeglass frames, especially for positioning them relative to their optical center, or their contouring which is necessary to adapt them to the grooves of the frames for which they are intended.

At the present time, with regard to ophthalmic lenses of organic material, such marks or indicia are usually applied by means of a colored varnish which may later be removed with a solvent, for example, acetone or trichlorethylene.

The major drawback of such a marking procedure is that after removing the marks, which is obviously necessary before the lenses may be used because the marks locally obstruct the same, there is no indicia by which its characteristics may be easily and quickly ascertained.

However, it may be necessary, at some later date, after the ophthalmic lens has been mounted in an eyeglass frame to check its characteristics.

Furthermore, it is desirable for the ophthalmic lenses to bear a permanent indication of its origin or manufacture.

For these reasons it is already been contemplated to permanently, indelibly apply such marks.

This gives rise to the problem that such marks should remain invisible under normal conditions of use, namely normal lighting, and should not substantially impair the optical qualities of the lens on which they are applied.

According to a first known method, these marks are etched into the organic material. This is in practice a time-consuming and relatively expensive method.

According to other known methods for mineral glass lenses, the marking is accomplished by a controlled localized deposit of a metal or metallic salt on the lens, which may optionally include an ion exchange between the metal or metallic salt and the lens itself. Such a deposit is made sufficiently small so as not to be visible to the naked eye under normal lighting conditions and becomes visible by breathing on, thus fogging, the lens or under special lighting conditions, such as ultraviolet radiation.

Whether such a method is carried out in a vacuum or by electronic bombardment the deposition of such a metal or metallic salt is a delicate operation to accomplish and requires elaborate and expensive equipment. Besides, it is not readily apparent that such a marking procedure would be applicable to ophthalmic lenses of organic material.

SUMMARY OF THE INVENTION

A general object of the present invention is the easy, economic and indelible marking of ophthalmic lenses of organic material so that such marks are not normally visible, but only when subjected to special radiation.

A more specific object provides a method of marking such organic ophthalmic lenses and an ophthalmic lens marked according to such a method.

The invention is based on the observation that chemical substances, known as optical brighteners, which are commonly used at the present day in the textile industry for bleaching cloth, lend themselves relatively well to the fixing of marks which are invisible under normal lighting conditions and only perceptible to the naked eye when subjected to ultraviolet radiation.

The invention is also based on the complementary observation that such optical brighteners are capable of being applied by thermal transfer from a temporary support to their ultimate support according to a process known per se, their vapor tension being sufficiently high to satisfy the requirements of such a process, and their compatibility with the material of the ultimate support, organic material in practice, being sufficient so that they may be absorbed in vapor form into the material and therefore, after returning to its solid state, indelibly anchored to the latter.

According to the invention there is provided a method of applying to an ophthalmic lens of organic material at least normally invisible mark which become perceptible under the effect of ultraviolet light, characterized by the material selected for marking the lens being at least in part an optical brightener.

Actually this method involves contact between the marking material and the lens to be marked and the application of heat between the marking material and the lens.

Also in practice, the marking material is initially carried by a temporary support and the application of heat necessary for the thermal transfer of the marking material onto the support is effected by means of a heating implement generally of the same configuration as the lens.

The marking of such a lens according to the present method is very expediently performed.

The features and advantages of the invention will become more readily apparent from the following description, given by way of example, with reference to the accompanying diagrammatic representations.

DETAILED DESCRIPTION OF THE PREFERRED EMBODIMENT

Figure 1:
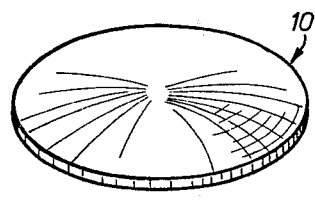
FIG. 1 is a perspective view of an ophthalmic lens of organic material marked according to the invention.

FIG. 1 shows an ophthalmic lens denoted by general reference number 10. By the term "ophthalmic lens" for the purposes of the present application I intend the blank lens of circular contour sold to practitioners, viz. opticians, for mounting into an eyeglass or spectacle frame, after the periphery is suitably edged or contoured by the practitioner.

The particular ophthalmic lens is for example made of poly [ethylene glycol di-allyl di-carbonate] sold under the trade name "CR 39".

Such a lens bears one or more marks or indicia. Such marks or indicia as illustrated in FIG. 1 are normally invisible, that is to say, it is not possible to perceive them on the lens 10 when it is viewed under normal lighting conditions.

Figure 2:
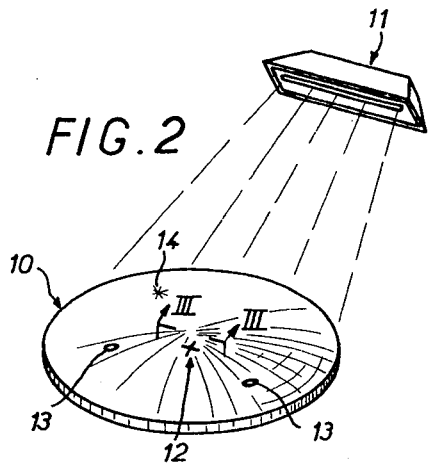
FIG. 2 is a perspective view similar to that of FIG. 1 when the marks carried by the lens are made visible.

As seen in FIG. 2, such marks become perceptible under effect of ultraviolet radiation, that is, when the lens 10 is placed in a beam of radiation emitted by a source of ultraviolet radiation 11, such as a Wood lamp.

In the illustrated example, the lens 10 bears three different types of marks or indicia. First of all, a cross hair or "X" 12 indicating the optical center of the lens. Next, two reference marks of circular configuration. And last of all, some sign or indicia 14 comprising a trademark.

It goes without saying that other types of marks or indicia may be envisaged, such as an indication of the corrective power of the lens.

Figure 3:
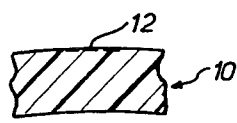
FIG. 3 is a fragmentary cross-sectional view of the lens, on a enlarged scale, taken on the line III—III in FIG. 2.

In any event, according to the invention, such an indicia comprises a local deposit, such as represented in FIG. 3, of a substance containing an optical brightener, an optical brightener-based composition, or exclusively of an optical brightener.

Optical brighteners, as is known, belong to the chemical family of derivatives of benzoxazolyls, stilbenes, and benzotriazoles.

In practice, amongst optical brighteners which are appropriate for the present invention are namely sold under the names FLUOLITE XMP a trademark of ICI, LECOPUR EGM, a trademark of SANDOZ, and UVITEX OB, a trademark of CIBA-GEGY. These optical brighteners are available in powder form and dispersable in a solvent medium.

In order to be able to use such optical brighteners they must be dispersed in a medium comprising one or more solvents and a binder, such as a plastifier, acting as a thickener, by which a suitable viscosity may be obtained.

Preferably the ingredients are loaded in a mill, for example a ball mill to obtain a suitable granulometry or particle size, which is less than 5μ. Milling has the additional advantage of producing good dispersion and good uniformity.

By way of illustration several examples of satisfactory compositions are given which are not intended to be limitative of compositions within the scope of the invention. The amounts are indicated in percentages by weight of the composition.

EXAMPLE I

| | |
|---|---|
| Optical brightener: FLUOLITE XMP | 0.5% |
| Solvent: xylene | 9.5% |
| Binder: glycerophtalic varnish | 90% |

A glycerophtalic varnish which is found to be particularly particularly satisfactory is the one sold by Piccapane under the mark EBA.

EXAMPLE II

| | |
|---|---|
| Optical brightener: LOCOPUR EGM | 1% |
| Solvent: ethanol | 89% |
| Binder: ethylcellulose | 10% |

The ethanol may, where desired, be replaced by a mixture of methylethylketone and methanol.

EXAMPLE III

| | |
|---|---|
| Optical brightener: UVITEX OB | 5% |
| Solvent: alcohol | 5% |
| Binder: nitrocellulose | 90% |

Alternatively the nitrocellulose may be replaced by an ethyl acetate, a butyl acetate or a pentyl acetate or by a mixture of 15% nitrocellulose, 55% acetate and 20% dibutylphtalate, or dibutylphtalate, which is a plastifier, on its own.

The marking composition may be applied to the lens 10 with a paint brush. However, preferably, it is applied by the intermediary of a temporary transfer support on which the marking composition is temporarily deposited.

Figure 4:
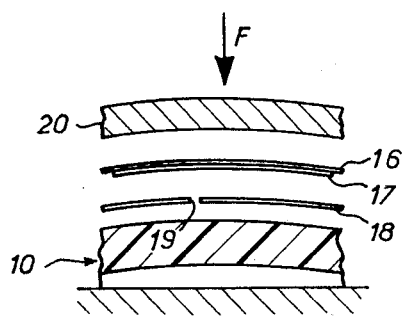
FIG. 4 is a fragmentary cross-sectional view illustrating a preferred method for marking a lens.

Such a method is illustrated diagrammatically in FIG. 4 where we see a fragment of the lens 10 to be marked. The temporary transfer support 16 is a sheet of kraft paper or a sheet of filter paper.

In the preferred method of FIG. 4 the sheet 16 is coated on one side with a coating 17 of marking composition. A mask or stencil 18 is interposed between the coating 17 and the lens 10 and has local openings 19 defining the contour of the indicia to be applied.

Figure 5:
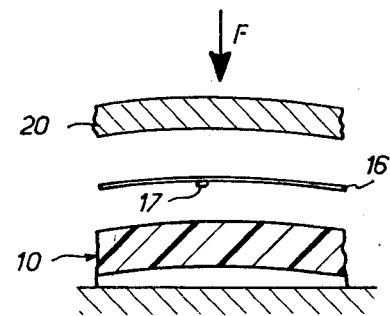
FIG. 5 is a view similar to FIG. 4 for a modified method for marking a lens.

Alternatively, in FIG. 5, the marking composition 17 is applied in its desired configuration directly on the transfer sheet 16.

In either event the marking substance 17 on the transfer sheet 16 is in a dry state at the moment of application. Indeed the solvent which permits its application in liquid form on the transfer sheet 16 is allowed to evaporate before the actual transfer.

Besides the solvent permitting dispersion of the optical brightener more easily for the preparation of the marking substance 17, it permits faster drying of the sheet 16 on which the marking composition is applied by its evaporation.

In any case the present method involves contact of the marking composition 17 with the lens 10 and heating the marking substance and the lens for thermal transfer of the marking substance from the temporary transfer support 16 to the lens 10.

In the examples illustrated in FIGS. 4 and 5 heat is applied by means of a heating implement 20, generally of the same configuration as the lens 10, which is brought into position as represented by the arrows F in FIGS. 4 and 5.

The heating implement 20 is held in place for a short period of time, of the order of 45 seconds. The pressure applied is just enough for the desired contact between the marking composition 17 and the lens 10 to occur under the best conditions, either through the openings 19 in the mask 18 in the method illustrated in FIG. 4 or directly on the lens as illustrated in FIG. 5.

The temperature of the heating implement 20 is determined so that the temperature of the temporary transfer sheet 16 is not too high, and is in the range of from about 180° to 220° C.

If desired, before applying the heating implement 20 the lens 10 may be preheated to a temperature below that of the transfer, of the order of 100° C. Alternatively the lens may be at ambient temperature.

Likewise, should it be desired, it is possible to avoid direct contact between the heating implement 20 and the temporary transfer support 16 by interposing between the heating implement and the sheet another sheet (not shown) of the same material as the one bearing the marking substance.

To attain precision marking on the lens 10 there must be an accurate positioning with respect to the same. This can be accomplished with a mask serving as a stencil 18 as in the embodiment of FIG. 4, or of the temporary transfer support or sheet 16 in the embodiment of FIG. 5. The use of a mask serving as a stencil produces a sharper outline of the ultimate mark or indicia. Such a mask is preferably self-adhesive, to stick directly on the lens.

In any event, in the course of applying heat to the marking substance 17 by means of the heating implement 20, at least some of the optical brightener is sublimed. As such sublimation occurs in contact with the lens 10 at least some of the vapor produced in absorbed by the material constituting the lens.

After marking, the lens 10 is washed, e.g., in acetone, trichlorethylene, or with any other solvent capable of removing excess optical brightener which was not sublimed, and perhaps some varnish or binder which may have migrated with the optical brightener.

The part of the optical brightener which, after sublimation, migrated into the material constituting the lens 10, thereby produces on the surface of the lens an indelible marking which penetrates into the lens material and is anchored therein.

As mentioned above, the indicia or marks are normally invisible (FIG. 1) and are perceptible only when they are under the effect of ultraviolet radiation (FIG. 2).

The present invention is of course not limited to the various methods described and illustrated but encompasses all modifications, variations and alternatives; in particular, it is possible to carry out the thermal transfer under vacuum conditions thereby enabling the heating temperature for transfer to be lower.

Furthermore, the field of application of the invention is not restricted to ophthalmic lenses of organic lenses sold under the trade name "CR 39" but includes lenses of other organic substances, for example, polycarbonate or polymethyl methacrylate or transparent polyurethane

What I claim is:

1. A method of marking ophthalmic lenses of organic material selected from the group consisting of poly [ethylene glycol di-allyl di-carbonate], polycarbonate, polymethyl methacrylate and transparent polyurethane, said method comprising the steps of bringing a marking substance containing an optical brightener on a temporary transfer support into direct contact with the surface of the organic material lens to be marked, heating the marking substance and the lens to permit sublimation of the optical brightener, and configuring the marking substance into at least one mark or indicia before it is transferred to the organic material of said lens.

2. A method according to claim 1, further comprising interposing a mask serving as a stencil defining the configuration of the mark or indicia between the marking substance and the lens to be marked before transferring the marking substance.

3. A method according to claim 1, further comprising configuring the marking substance into the desired mark or indicia when the marking substance is applied to the transfer support.

4. A method according to claim 1, further comprising allowing the marking substance to become dry before applying it to the lens.

5. A method according to claim 1, further comprising preparing the marking substance by mixing the optical brightener with a solvent and a binder.

6. A method according to claim 1, wherein heating the marking substance and the lens comprises bringing a heating surface of configuration complementary to the lens into overlying relation with the transfer support and the lens whereby the heat is transferred essentially by conduction.

7. A method according to claim 1, wherein the heating of the lens is preceded by preheating the lens alone to a temperature below that necessary for marking the lens.

8. A method according to claim 1, further comprising washing the lens with a solvent for the marking substance after applying the mark or indicia to the lens.

9. A method according to claim 1, wherein the optical brightener is a derivative of one of the group consisting of benzoxazolyls, stilbenes, and benzotriazoles.

10. An ophthalmic lens of organic material selected from the group consisting of poly [ethylene glycol di-allyl di-carbonate], polycarbonate, polymethyl methacrylate and transparent polyurethane and having at least one mark or indicia of thermally-transferred, sublimed optical brightener on a surface of the lens and anchored in the organic material constituting the lens.

11. An ophthalmic lens according to claim 10, wherein the optical brightener is a derivative of one of the group consisting of benzoxazolyls, stilbenes, and benzotriazoles.

* * * * *